US010750670B2

(12) United States Patent
Logan

(10) Patent No.: US 10,750,670 B2
(45) Date of Patent: Aug. 25, 2020

(54) HORTICULTURAL PROPAGATION CAPSULE AND KIT CONTAINING SAME

(71) Applicant: Benjamin J. Logan, Lapeer, MI (US)

(72) Inventor: Benjamin J. Logan, Lapeer, MI (US)

(*) Notice: Subject to any disclaimer, the term of this patent is extended or adjusted under 35 U.S.C. 154(b) by 210 days.

(21) Appl. No.: 16/008,427

(22) Filed: Jun. 14, 2018

(65) Prior Publication Data

US 2018/0368332 A1 Dec. 27, 2018

Related U.S. Application Data

(60) Provisional application No. 62/523,210, filed on Jun. 21, 2017.

(51) Int. Cl.
*A01G 9/00* (2018.01)
*A01G 2/20* (2018.01)
*A01G 9/029* (2018.01)

(52) U.S. Cl.
CPC ............... *A01G 2/20* (2018.02); *A01G 9/029* (2018.02)

(58) Field of Classification Search
CPC . A01G 2/00; A01G 2/20; A01G 9/026; A01G 9/029; A01G 24/44; A01G 24/60; A01G 9/16; A01G 13/0237; A01G 13/0243; A01G 13/04; A01G 13/105; A01G 17/00; A01G 17/04; A01G 17/10
USPC ......... 47/5.5, 32, 32.7, 32.8, 41.13, 58.1 CF, 47/66.1, 66.3, 66.4
See application file for complete search history.

(56) References Cited

U.S. PATENT DOCUMENTS

| 1,655,731 | A | * | 1/1928 | May, Jr. et al. | ......... A01G 2/20 47/73 |
| 3,052,062 | A | * | 9/1962 | Geisthoff | ................. A01G 2/20 47/5.5 |
| 4,175,355 | A | * | 11/1979 | Dedolph | ................. A01G 24/60 47/64 |
| 4,196,543 | A | * | 4/1980 | Dedolph | ................. A01G 24/60 47/5.5 |
| 4,216,622 | A | * | 8/1980 | Hollenbach | ............ A01G 9/029 47/71 |
| 6,050,027 | A | * | 4/2000 | Pavelka | ................. B65D 75/22 47/84 |
| 8,127,489 | B2 | * | 3/2012 | Cagata | ................... A01G 9/029 47/5.5 |

(Continued)

*Primary Examiner* — Peter M Poon
*Assistant Examiner* — Danielle A Clerkley
(74) *Attorney, Agent, or Firm* — Carrier Blackman & Associates, P.C.; William D. Blackman; Joseph P. Carrier

(57) ABSTRACT

A latchably closable horticultural capsule is configured to contain a growing medium, and to be temporarily closed around a branch section of a parent plant during an air-layering propagation process. The capsule includes a first shell portion and a second shell portion pivotally joined together by a central hinge. The first shell portion includes a main shell body having a cup-like shape configured to partially surround the branch section, the main shell body having opposed end walls with notches formed therein. The first shell portion also includes two seal-receiving cups externally attached to the end walls of the main shell body. The seal-receiving cups have hollow notches formed in respective edge portions thereof, and are also configured to partially surround the branch section. The notches of the seal-receiving cups are substantially linearly aligned with one another, and also with the notches of the main shell body.

12 Claims, 15 Drawing Sheets

(56) References Cited

U.S. PATENT DOCUMENTS

| | | | |
|---|---|---|---|
| 8,171,669 B1 * | 5/2012 | Park | A01G 9/029 47/32 |
| 8,752,331 B1 * | 6/2014 | Park | A01G 9/029 47/79 |
| 2015/0040469 A1 * | 2/2015 | Liesche | A01G 9/029 47/5.5 |
| 2017/0112076 A1 * | 4/2017 | Kotter, Sr. | A01G 9/029 |

* cited by examiner

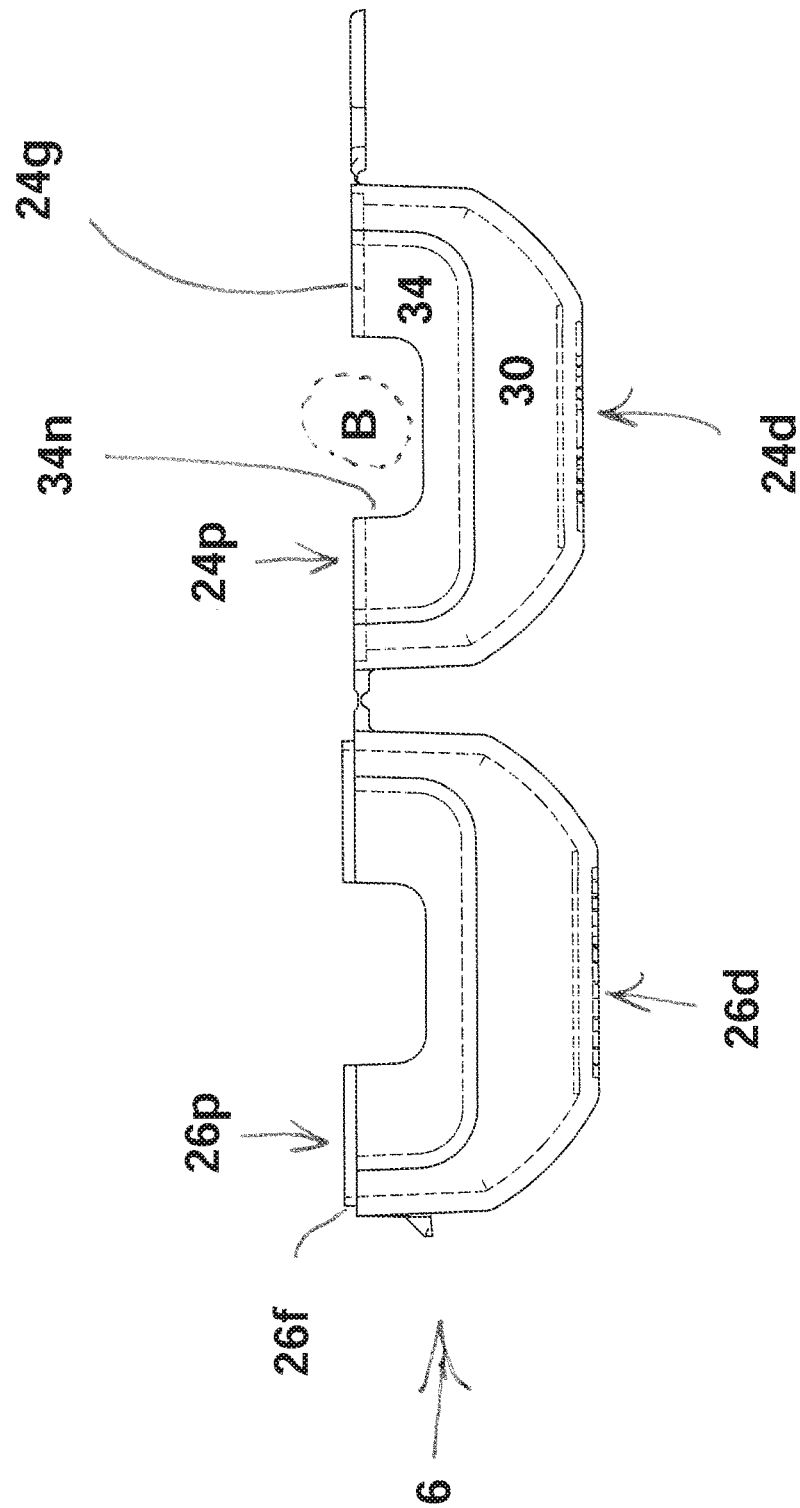

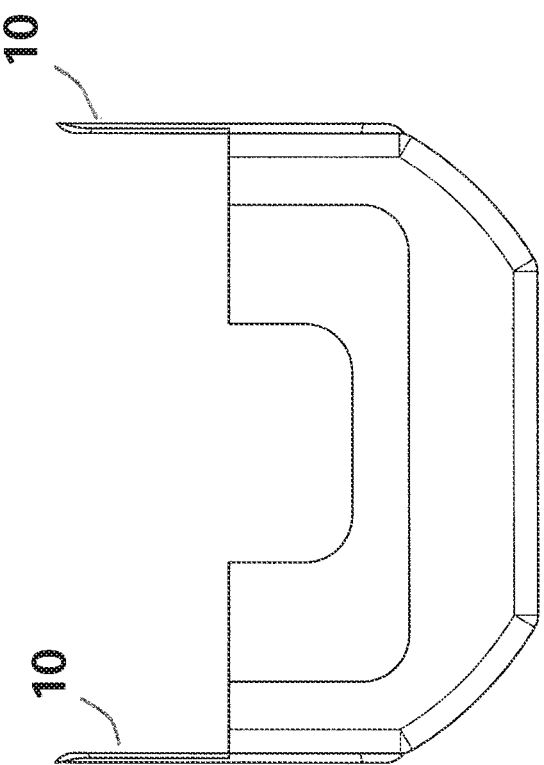
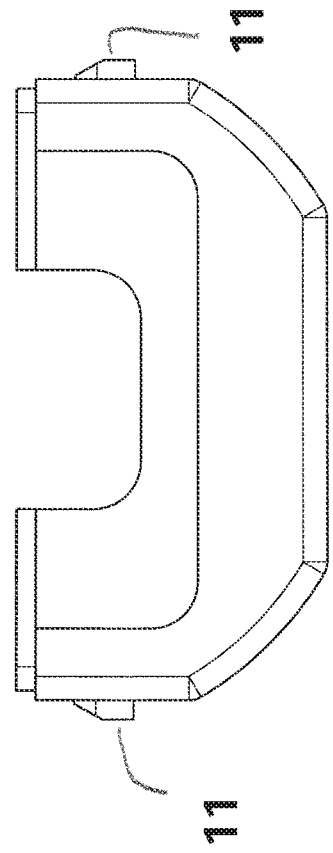
FIG. 11

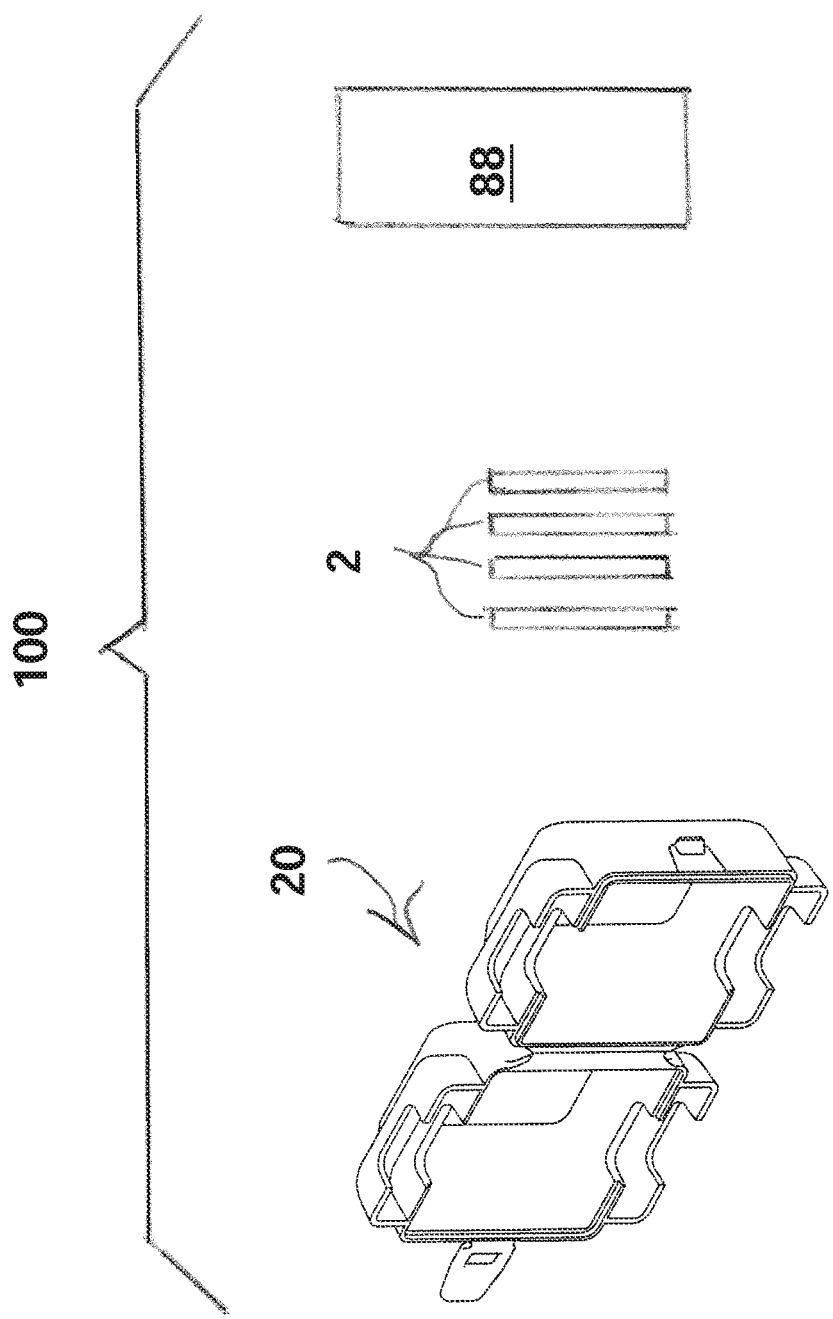

HORTICULTURAL PROPAGATION CAPSULE AND KIT CONTAINING SAME

CROSS-REFERENCE TO RELATED APPLICATIONS

The present application claims priority under 35 U.S.C. 119(e), based on U.S. provisional patent application 62/523,210, filed 21 Jun. 2017. The entire disclosure of the referenced priority document, including specification, claims, and drawings, is incorporated by reference herein.

BACKGROUND OF THE INVENTION

Field of the Invention

The present invention relates to a horticultural propagation capsule configured to contain a growing medium, and to be temporarily closed around a branch section of a parent plant and left in place during an air-layering propagation process. In addition, the present invention relates to a kit containing the horticultural propagation capsule, and to a method of using the capsule to generate a separate, viable progeny plant from and established parent plant.

Background Art

Plants can be propagated in many ways, but one known and time-tested method is called "air layering." Traditionally, about one inch of bark or phloem of a stem or branch is removed, to expose living tissue underneath, while the remainder of the bark is left attached to the main plant. The bark-stripped area of the branch is then covered with a suitable growing medium such as soil or moist peat moss, and is then wrapped with cloth, tape, or another medium to hold the soil and the moisture in place against the plant stem. Rooting hormone may be mixed into the growing medium.

After a suitable period of time, which may be days or weeks, roots will start to grow out of the covered, bark-stripped area of the plant, until there are sufficient roots that the branch can be cut from the main plant and then transplanted into the ground as a separate, viable plant.

SUMMARY OF THE INVENTION

A horticultural propagation capsule according to a first embodiment of the invention includes a molded plastic capsule with foam seals at each end. The capsule may, alternatively, be designed as a two-part unit or a one pieced hinged unit that can be filled with a growing medium, and then clamped around a suitable branch of a plant or tree. The seals at the ends of the capsule adapt to the shape of the branch, hold the capsule in position on the parent plant, and also seal in moisture inside of the capsule.

The first embodiment of the invention provides a latchably closable horticultural capsule which is configured to contain a growing medium, and to be temporarily closed around a branch section of a parent plant during an air-layering propagation process.

The horticultural propagation capsule according to the first embodiment includes a first shell portion and a second shell portion, pivotally joined together by a central hinge. The first shell portion includes a main shell body having a cup-like shape configured to partially surround the branch section, the main shell body having opposed end walls with notches formed therein.

The first shell portion also includes two seal-receiving cups externally attached to the end walls of the main shell body. The seal-receiving cups also have hollow notches formed in respective edge portions thereof, and are also configured to partially surround the branch section. The notches of the seal-receiving cups are substantially linearly aligned with one another, and also with the notches of the main shell body.

In a horticultural propagation capsule according to a second embodiment, many features are the same as in the first embodiment, but in this second embodiment, the second shell portion is replaced by a modified plate having a central longitudinal groove formed therein, the modified plate being integrally attached to the first shell portion by a hinge.

The present invention also provides a horticultural propagation capsule according to a third embodiment, which is another variation of the capsule according to the first embodiment. In the third embodiment, the first shell portion and the second shell portion are formed as separate components which, unlike the first embodiment, are not interconnected by any hinge portion, but which can be temporarily and removeably connected together. In this third embodiment, the first shell portion has two flexibly resilient latching plates extending outwardly from a main shell body thereof, and the second shell portion has two projections disposed on opposite sides thereof, which fit into the latching plates to temporarily and disengageably connect the first and second shell portions together.

A fourth embodiment of the present invention provides a kit including a horticultural propagation capsule, a plurality of seal members and a quantity of a growing medium.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3 is a side plan view of the horticultural propagation capsule of FIGS. 1-2B.

FIG. 11 is a side plan view of the horticultural propagation capsule of FIGS. 9-10.

FIG. 14 is a simplified diagram showing components of a horticultural propagation kit according to the present invention.

DETAILED DESCRIPTION OF ILLUSTRATIVE EMBODIMENTS

It should be understood that only structures and methodology needed for illustrating selected embodiments of the present invention are described herein. Other conventional structures, and those of ancillary and auxiliary components of the system, will be known and understood by those skilled in the art.

First Embodiment:

The first embodiment of the invention provides a latchably closable horticultural propagation capsule 20 which is configured to contain a growing medium, and to be temporarily closed around a branch section of a parent plant during an air-layering propagation process.

Figure 1:
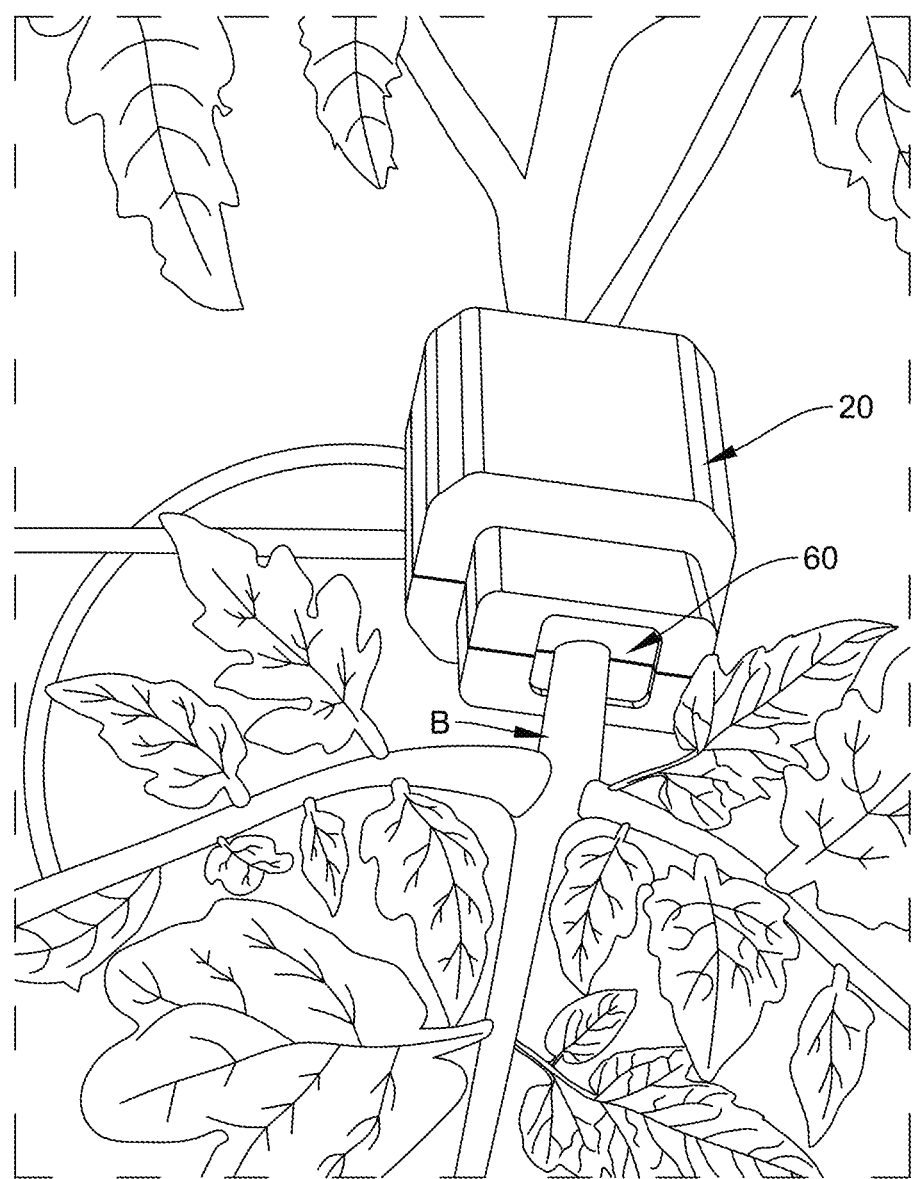
FIG. 1 is an environmental perspective view showing a horticultural propagation capsule according to a first embodiment of the invention, attached to, and surrounding part of a branch of a plant.

Referring now to FIG. 1, a molded plastic horticultural propagation capsule or "Root Pod"™ is shown generally at 20. FIG. 1 shows a capsule 20 attached to a branch B of a plant, with seal members 60 disposed in seal-receiving cups thereof. The seal members 60 are provided to adapt to the diameter and shape of the branch B at the point of attachment, in order to secure the capsule in place on the branch, and also to help retain moisture in a growing medium disposed inside of the capsule 20.

Figure 2A:
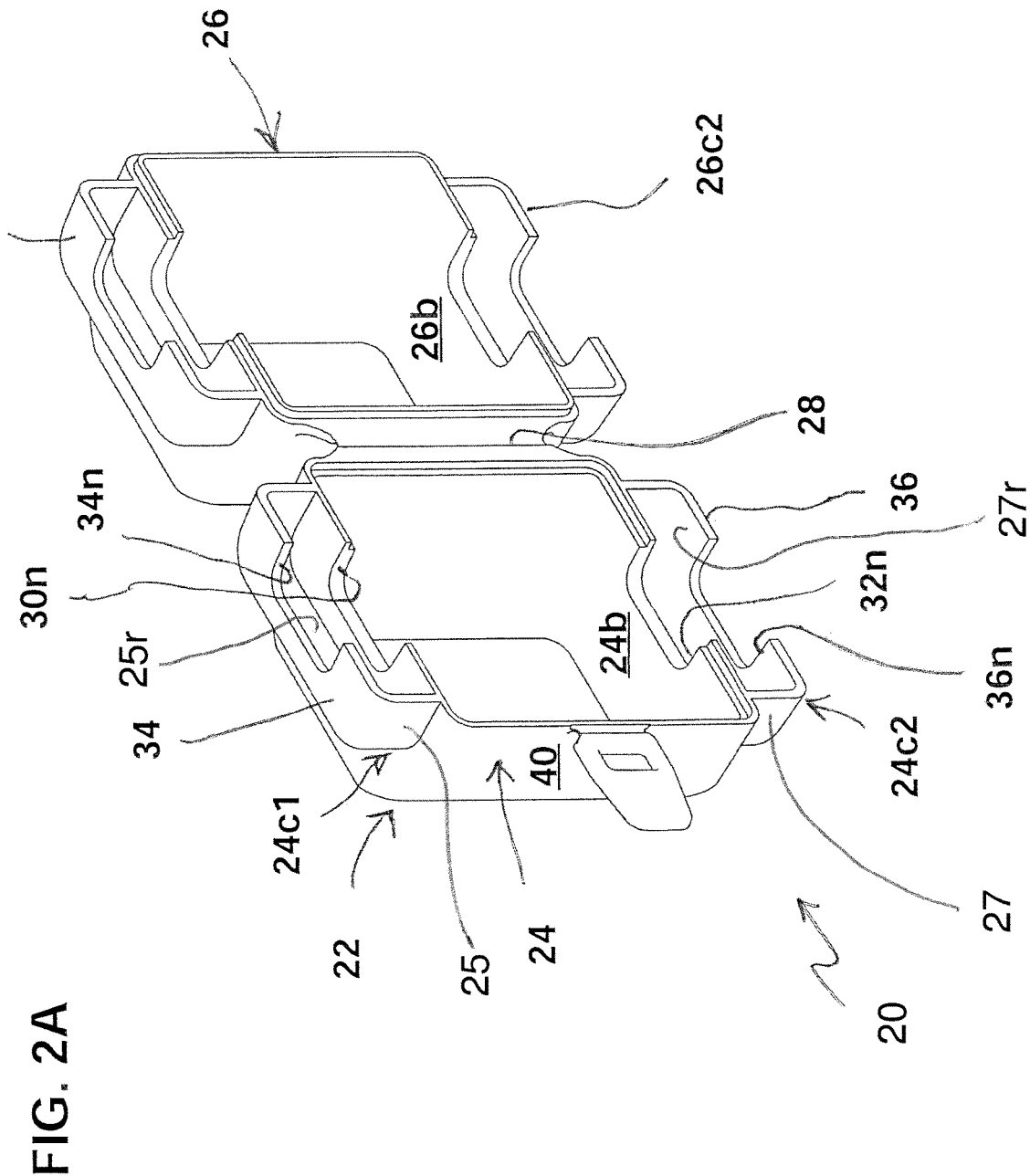
FIG. 2A is a perspective view of a horticultural propagation capsule according to a first embodiment of the present invention, taken from a first vantage point.
Figure 2B:
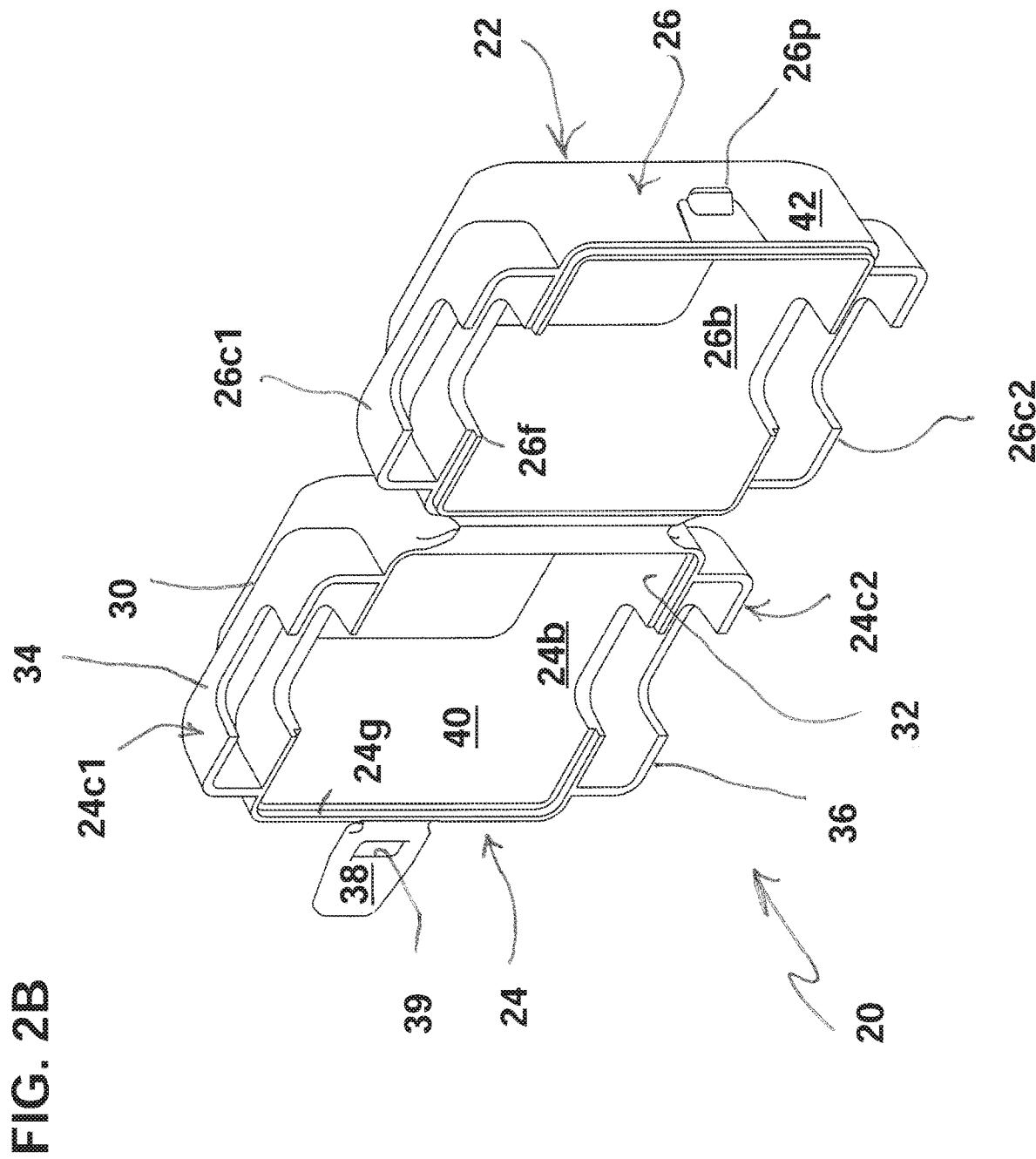
FIG. 2B is a perspective view of the horticultural propagation capsule of FIG. 2A, taken from a second vantage point which is different from the first vantage point.
Figure 4:
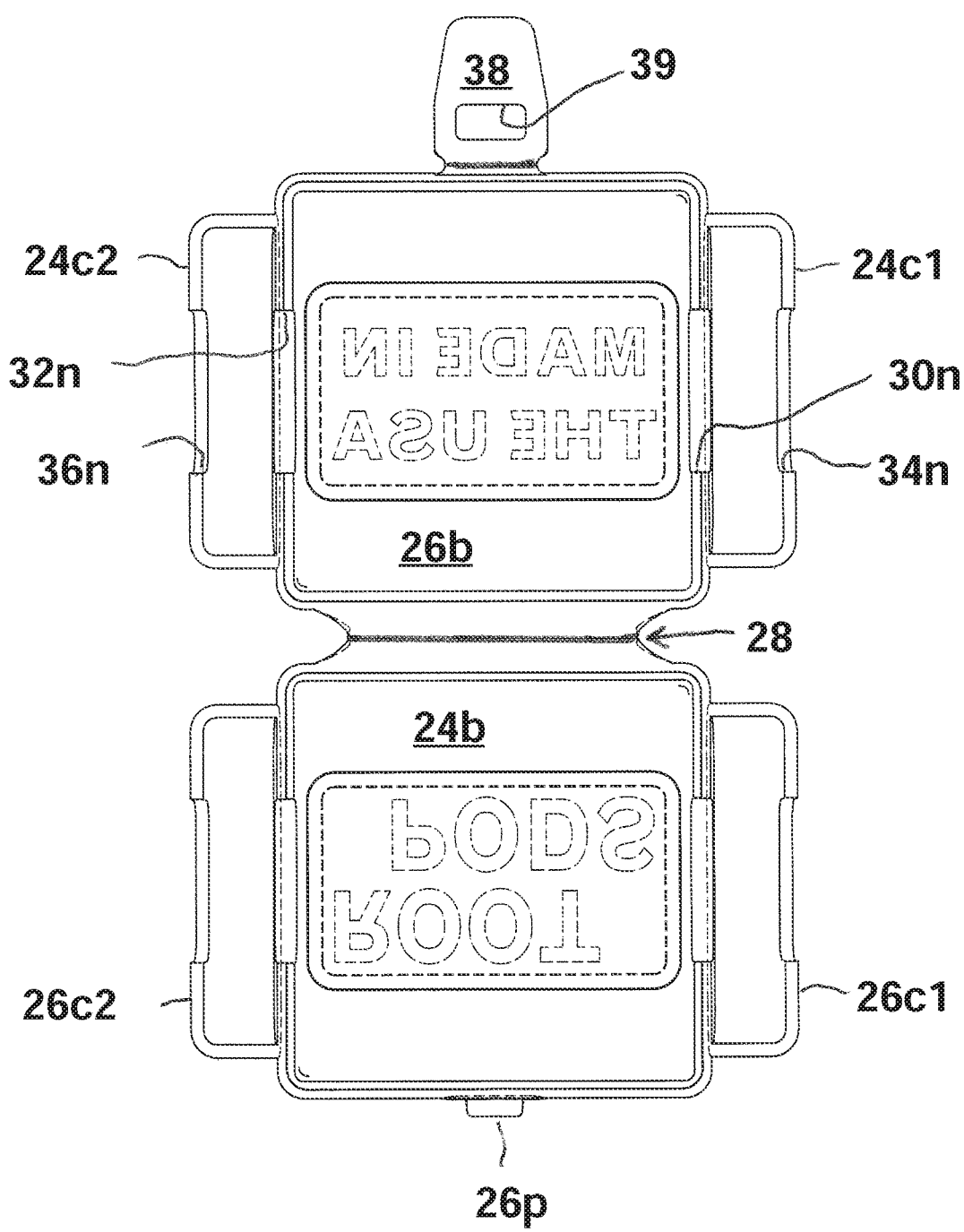
FIG. 4 is a rear plan view of the horticultural propagation capsule of FIGS. 1-3.

Referring now to FIGS. 2A-2B, the capsule 20 is made primarily as a two-part molded plastic shell 22, including a first shell portion 24 and a second shell portion 26 pivotally joined together by a central hinge 28, which may be formed as a living hinge. A latching mechanism, described later, is provided to close the first and second shell portions 24, 26 together in a closed configuration of the capsule 20 (shown in FIG. 1).

The first shell portion 24 includes a generally cup-shaped main shell body 24b and a pair of opposed seal-receiving cups 24c1, 24c2 which are integrally formed with, and disposed at opposite ends of the main shell body. As shown in FIG. 3, the first shell portion 24 has a proximal side 24p, for placement contacting a branch B, and a distal side 24d spaced away from the proximal side.

It should be understood that the branch B does not form a part of the present invention. Instead, the capsule 20 hereof may be used with any selected branch B of a plant which a user wishes to propagate by the air layering method.

First Shell Portion Structure

The main shell body 24b of the first shell portion 24 may be formed as a first half of a box-like shape with all corners rounded, as shown. Alternatively, the main shell body 24b of the first shell portion 24 may be formed as a first half of an ovoid egg-shape, or in any other desired hollow shape, suitable for holding a growing medium therein, and which may be closed, together with the second shell portion 26, around a branch B.

The main shell body 24b has opposed first and second end walls 30, 32, and each of these end walls has a corresponding cutout notch 30n, 32n configured to receive a portion of the branch B therein.

Similarly, and as shown in the drawings, the seal-receiving cups cups 24c1, 24c2 have opposed end walls 34, 36, respectively, and each of these end walls has a corresponding cutout notch 34n, 36n configured to receive a portion of the branch B therein. The seal-receiving cups 24c1, 24c2 also include side walls 25 and 27 (FIG. 2A) which join the main shell body 24b at areas spaced away from the hollow notches 30n, 32n of the main shell body, as shown, to define first and second seal receptacles 25r, 27r distinct from an interior space of the main shell body.

The notches 34n, 36n of the seal-receiving cups are substantially linearly aligned with one another, and also with the notches 30n, 32n of the main shell body.

Figure 5:
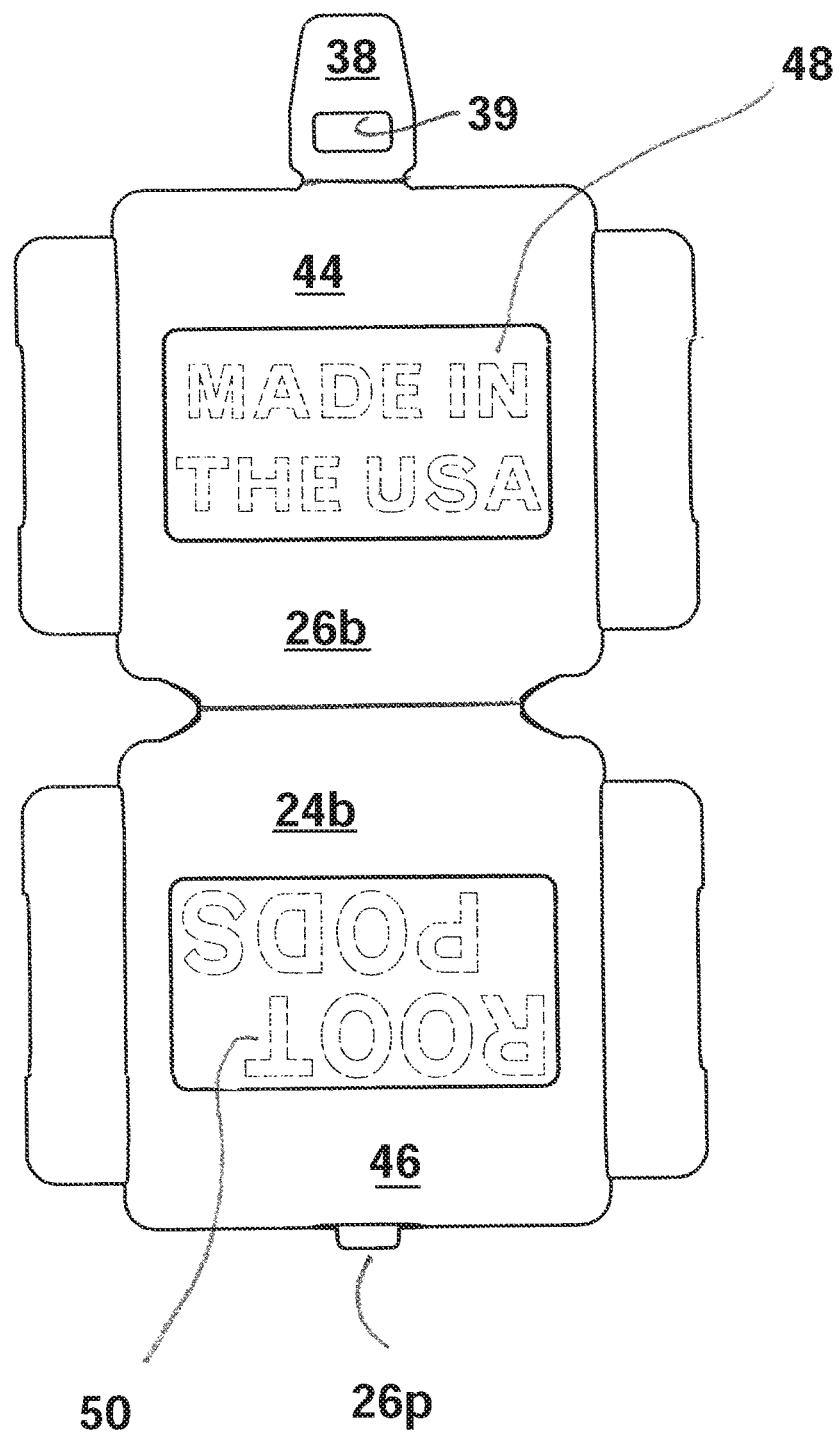
FIG. 5 is a front plan view of the horticultural propagation capsule of FIGS. 1-3.
Figure 6:
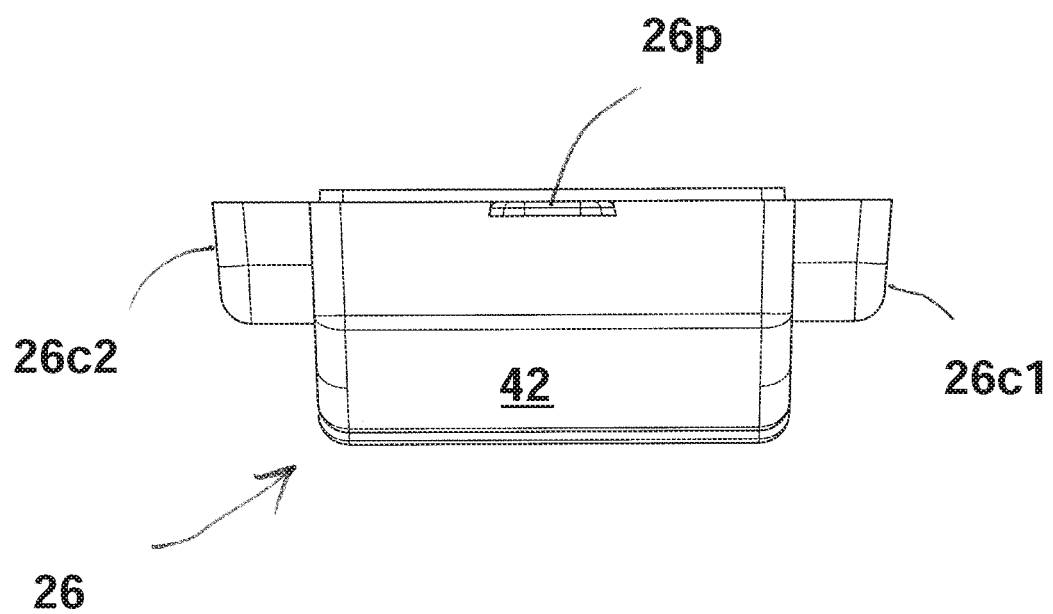
FIG. 6 is an end plan view of the horticultural propagation capsule of FIGS. 1-5, taken in the direction shown by the arrow 6 in FIG. 3.

As shown in FIG. 5, external distal walls 44, 46 of the first and second shell portions 24, 26 may have indicia 48, 50 formed respectively thereon. Where used, such indicia may include a brand name, an alphanumeric product designation and/or other selected information as desired. This indicia 48, 50 is shown in phantom because it is optional.

Optionally, the main shell body 24b of the first shell portion 24 may have a shallow peripheral groove 24g formed inside of the proximal edge portion thereof, as shown, for nestingly receiving a peripheral flange 26f of the second shell portion 26, in order to ensure proper alignment of the two shell portions 24, 26, and also to help retain moisture inside of the capsule 20.

Also in the capsule 20 according to the first embodiment, the first shell portion 24 has a pivotally movable latch plate 38 hingedly attached to a proximal portion of a side wall 40 of the main shell body 24b, which side wall is spaced away from the central hinge 28. The connection between the latch plate 38 and the main shell body 24b may be a living hinge. The latch plate 38 has an opening 39 formed therein to receive a projection 26p (FIG. 2b) provided on a side wall 42 of the second shell portion 26, in order to permit temporary closure of the capsule 20 around the branch section B of a parent plant.

Second Shell Portion Structure

The second shell portion 26 is pivotally attached to the first shell portion 24 at the central hinge 28. The second shell portion 26 is substantially a mirror image of the first shell portion 24 as described above, including a main shell body 26b and seal-receiving cups 26c1, 26c2 attached to the main shell body.

The second shell portion 26 has two primary differences from the first shell portion 24. First, instead of the of the shallow peripheral groove 24g formed inside of a proximal edge portion thereof, the second shell portion 26 may include a peripheral flange 26f (FIG. 2) extending outwardly at a proximal edge portion thereof, which flange fits nestingly into the peripheral groove 24g of the first shell portion 24, in order to ensure proper alignment of the two shell portions 24, 26, and also to help retain moisture inside of the capsule 20.

Secondly, instead of the pivotally movable latch plate 38 of the first shell portion's main shell body 24b, the second shell portion 26 is provided with a projection 26p (FIG. 2B) extending outwardly from the side wall 42 of the second shell portion 26. Where used, the projection 26p is configured to fit nestingly into the opening 39 of the latch plate 38 when the latch plate is closed over the projection, in order to permit temporary closure of the capsule 20 around the branch section B of a parent plant.

The two main shell bodies 24b, 26b of the capsule 20 can be prefilled with a suitable growing medium, such as soil or peat moss.

Alternatively, the capsule 20 may be sold as an empty shell which is filled with a growing medium by the end user. The growing medium may, optionally, may be infused with rooting hormone.

After the growing medium has been added, seals are placed into the seal-receiving cups 24c1, 24c2, 26c1, 26c2. These seals may be made of any suitable material, including foam rubber, rubber or elastomeric tubing, or a suitable moldable putty. The capsule 20 can then be placed in contact with, closed around a selected portion of a branch B and the two halves may be snapped together by the latch plate 38 engaging with the raised projection 26p.

After a suitable time period has elapsed, the capsule 20 can be opened again by flexing the latch plate 38 so that it disengages from the raised projection 26p, allowing the hinged capsule to be opened.

Second Embodiment

Figure 7:
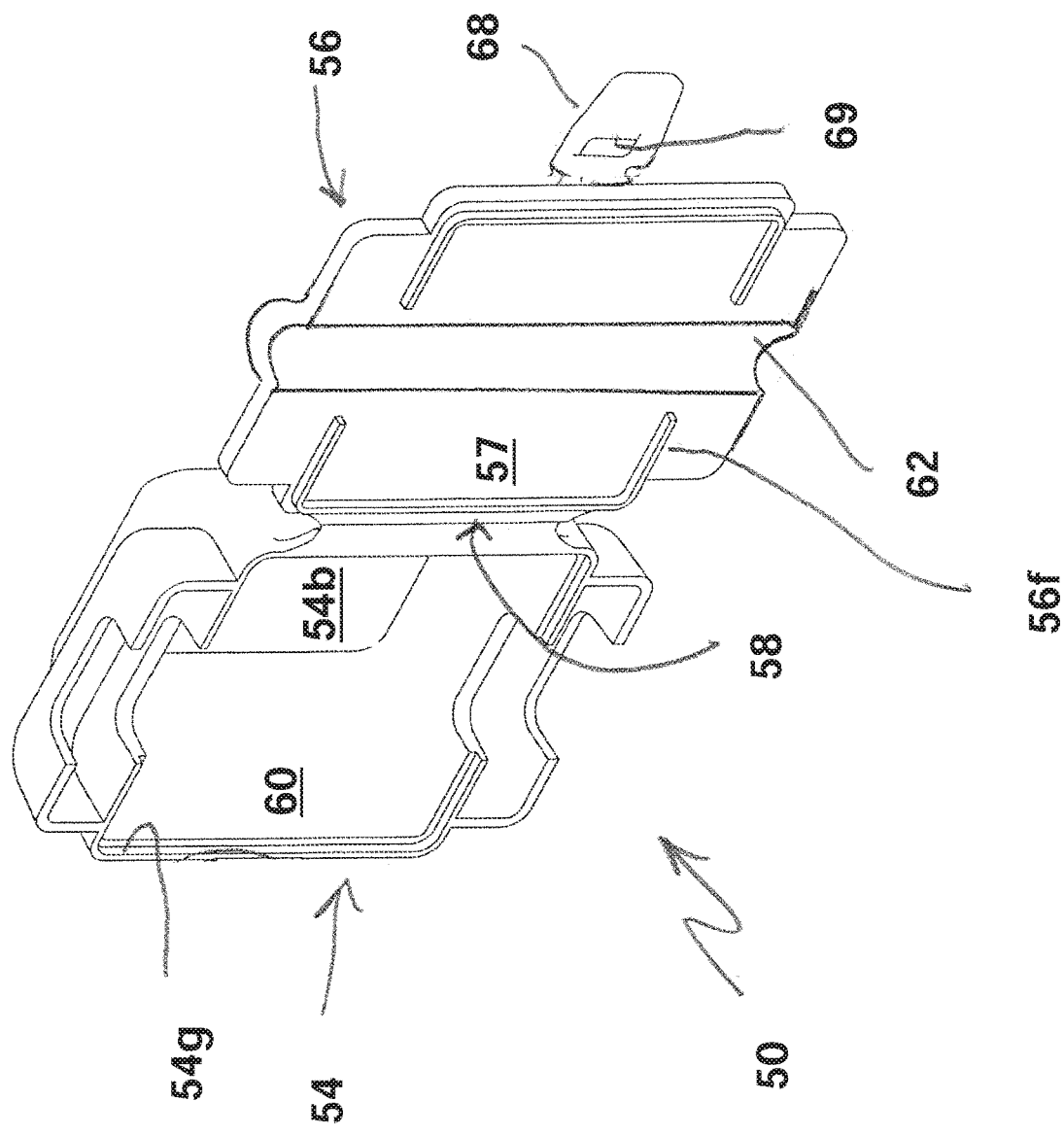
FIG. 7 is a perspective view of a horticultural propagation capsule according to a second embodiment of the invention.
Figure 8:
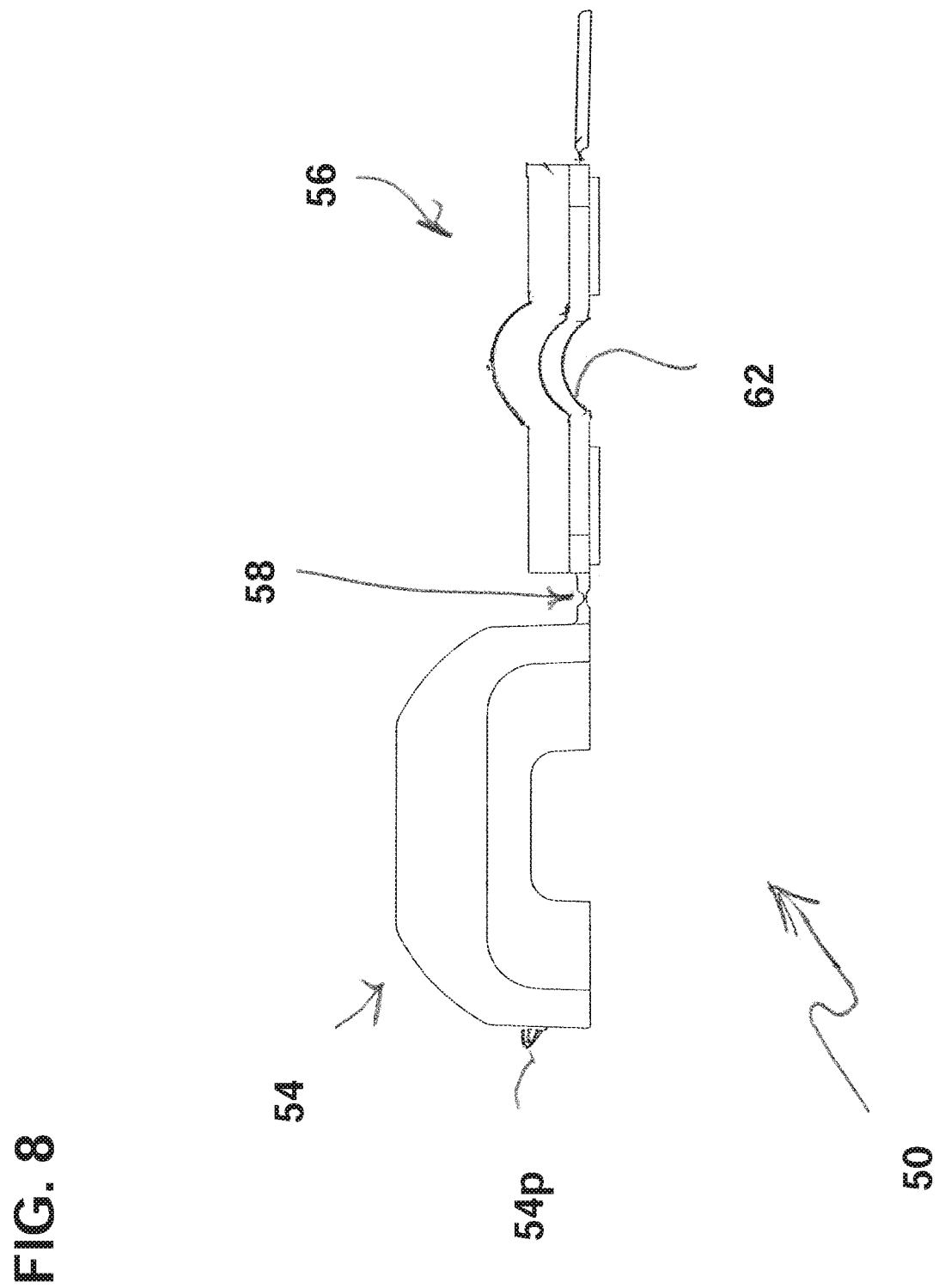
FIG. 8 is a side plan view of the horticultural propagation capsule of FIG. 7.

FIGS. 7-8 show a horticultural propagation capsule 50 according to a second embodiment hereof, where the capsule is molded in two asymmetrical sections 54, 56 interconnected by a hinge 58. Once again, this may be a living hinge.

In this second embodiment, the first section 54 of the capsule 50 is substantially identical with the first shell portion 24 described above in connection with the first embodiment, with one exception. In this second embodiment, instead of having the pivotally movable latch plate 38 thereon, a side wall 60 of the main shell body 54b has a projection 54p thereon, similar to the projection 26p described in connection with the first embodiment. The main shell body 54 may, optionally, have a shallow peripheral groove 54g formed therein, similar to the groove 24g of the main shell body 24 according to the first embodiment.

Further in this second embodiment, the second section 56 of the capsule 50 is formed as a substantially flat plate member 57 having a central longitudinal groove 62 formed therein for receiving part of the branch B when the capsule 50 is closed.

The plate member 57 may have an outwardly extending flange 56f formed thereon having a shape conforming to the shape of the peripheral groove 54g of the first section 54. Where used, this flange 56f fits nestingly into the peripheral groove 54g of the first section 54, in order to ensure proper alignment of the two shell portions 54, 56, and also to help retain moisture inside of the capsule 50.

In this second embodiment, growing medium and seals are used only in the first section of the capsule 50.

Third Embodiment

Figure 9:
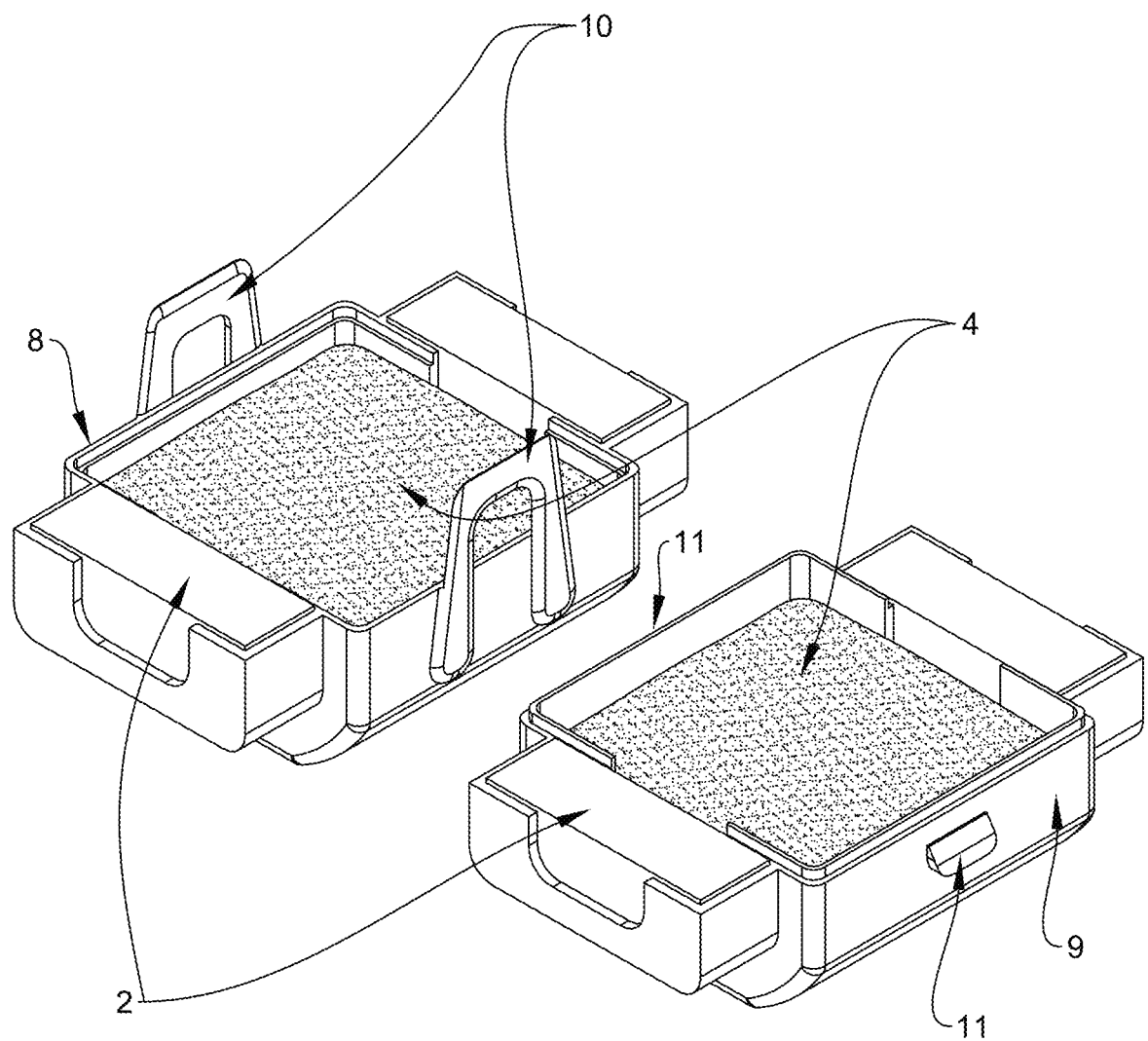
FIG. 9 is a perspective view of a horticultural propagation capsule according to a third embodiment of the invention, showing seal members and a growing medium therein.
Figure 10:
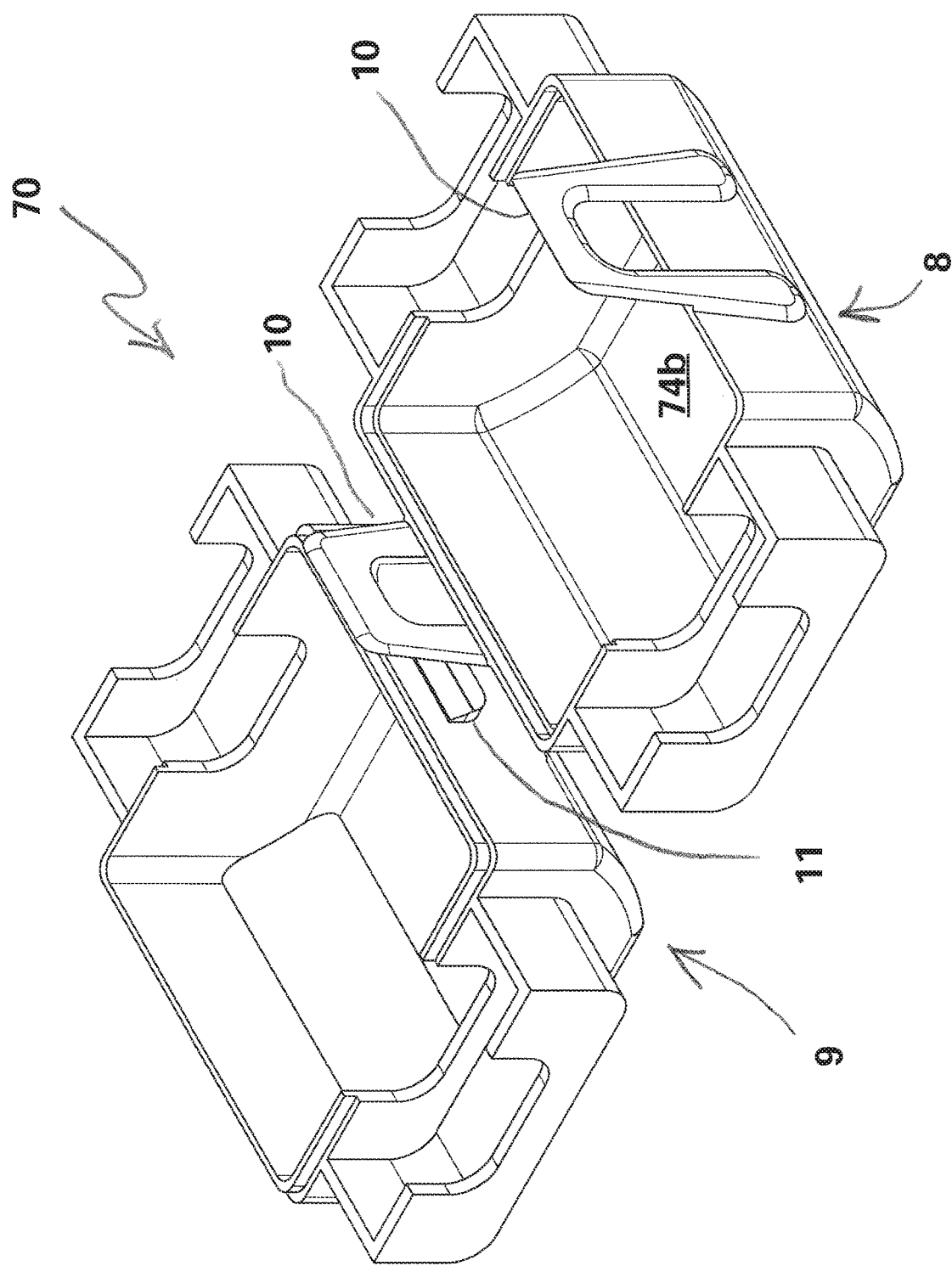
FIG. 10 is a perspective view of the horticultural propagation capsule of FIG. 9 shown empty.

FIGS. 9-11 illustrate a horticultural propagation capsule 70 according to a third embodiment hereof, where the capsule is molded in two shell portion halves 8 and 9, formed separately and designed to snap together. Two spaced-apart latches 10, 10, both provided on the first shell portion half 8, are configured to engage with raised projections 11, 11 provided on opposite sides of the second shell portion half 9, to temporarily and disengagably connect the shell portion halves 8, 9 together.

In this third embodiment of the capsule 70, the first shell portion half 8 is substantially similar to the first shell portion 24 as described herein in connection with the first embodiment of the capsule 20, with some selected differences which will be described subsequently.

In this third embodiment, the latches 10 are not hinged to the main shell body 74b. Instead, they are formed of flexibly resilient plastic material, and may be temporarily be moved so as to be spread apart and fit over corresponding projections 11 formed on opposite side walls of the second shell portion half 9.

The halves 8, 9 can be disengaged by spreading latches 10 apart, so that they release from raised projections 11 allowing the halves to be separated from one another. The sealing members 2 (FIG. 9), which may be formed as foam rubber inserts, allow the capsule to adapt to different branch sizes and also to secure itself to the branch. A suitable growing medium 4 can be prefilled or alternatively, may be filled by the end user.

Method of Use

Figure 12:
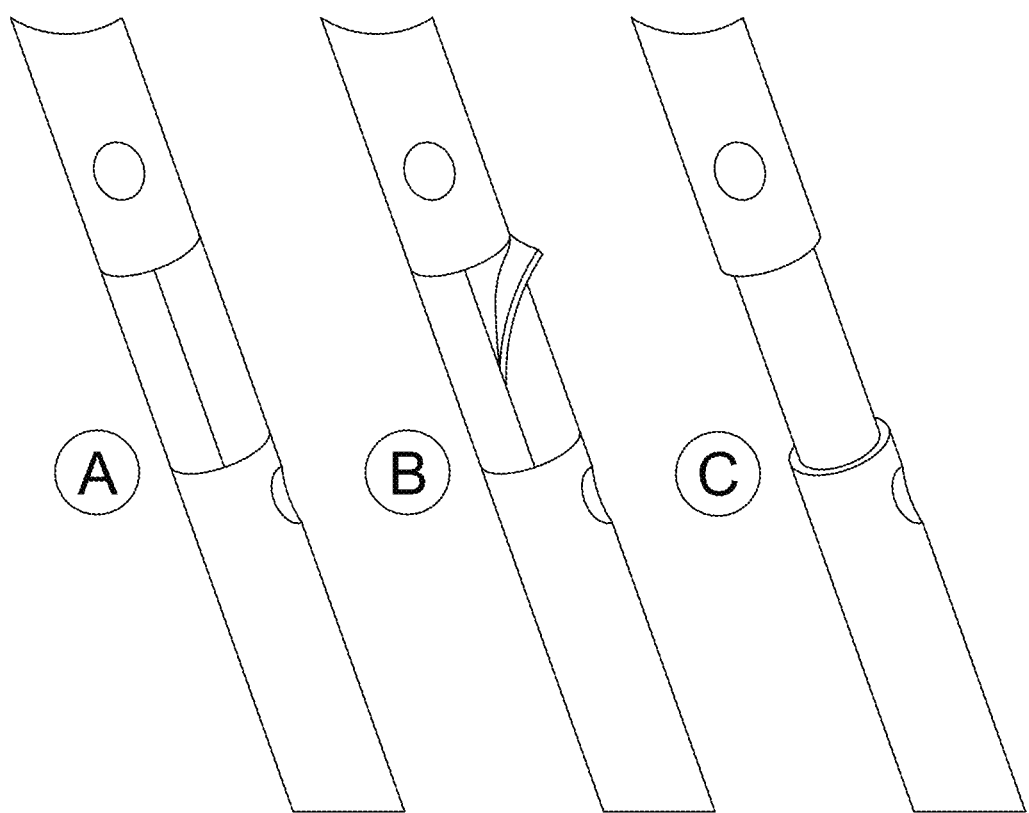
FIG. 12 illustrates a sequence of steps for preparing a branch or stem for attachment of a horticultural propagation capsule according to the present invention.
Figure 13:
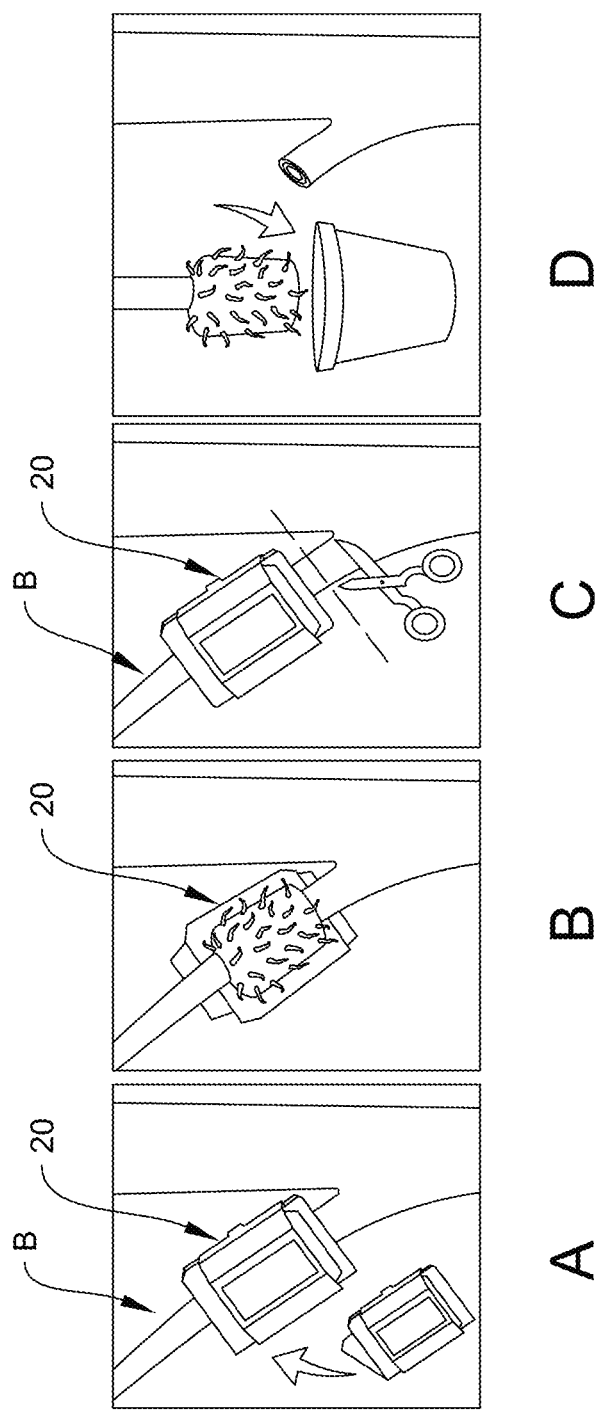
FIG. 13 illustrates a series of steps in generating a progeny plant from a branch of a parent plant, using the horticultural propogation capsule hereof.

FIG. 12 illustrates a sequence of steps for preparing a branch or stem for attachment of any one of the horticultural propagation capsules 20, 50 or 70 as previously described herein. FIG. 13 illustrates a series of steps in generating a progeny plant from a branch of a parent plant, using the horticultural propogation capsule hereof.

First, as shown in step A, two spaced-apart circumferential cuts are made around the branch, cutting only as deep as the bark extends. Then, a cut is made in the longitudinal direction of the branch to connect the two circumferential cuts together.

Then, as shown in step B, the bark is peeled away from the area of the branch between the two circumferential cuts, until the bark is completely stripped away from a selected part of the branch, giving it the appearance depicted in C.

After the branch has been prepared as described above, a suitable growing medium is placed inside of the capsule 20, the growing medium is moistened with water, and suitable sealing members are placed inside of the seal-receiving cups 24c1, 24c2. Optionally, a rooting hormone may be added to the growing medium.

The capsule 20 is then closed around the branch B, covering the area of the branch with the bark removed. This is illustrated in panel A of FIG. 13.

After a suitable period of time, which may be days or weeks, new roots will grow out of the covered, bark-stripped area of the plant. This is illustrated in panel B of FIG. 13.

The capsule is left in place on the branch B until there are sufficient roots to permit cutting off the branch from the main (parent) plant, and then transplanted into a pot or into the ground as a separate, viable progeny plant. Branch removal is illustrated in panel C of FIG. 13, and installation of the rooted progeny plant into a pot P is illustrated in panel D of FIG. 13.

Kit

The present invention also encompasses a kit 100 of components for use in a process of air layering of a plant. Referring now to FIG. 14, the kit 100 includes at least one horticultural propagation capsule 20 as described herein, a plurality of seal members 2, and a bag 88 containing a suitable growing medium. The capsule used in the kit may be any one of the capsules 20, 50 or 70 as described herein.

Optionally, the kit may also include a plurality of the horticultural propagation capsules 20, 50 or 70, wherein the capsules are substantially identical to one another. As another, different option, the kit may also include an appropriately-sized container of rooting hormone. Alternatively, a rooting hormone may be mixed into the growing medium of the kit.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the appended claims, are intended to be within the scope and spirit of the present invention.

I claim:

1. A horticultural propagation capsule for use in generating a root-bearing progeny plant from a parent plant, the capsule comprising:
   a hollow housing comprising a first shell portion and a closable cover member pivotally connected by a central hinge, the housing formed as an integral unitary plastic molding, the first shell portion comprising:
   a main shell body having first and second opposed side walls, first and second end walls connecting the side walls together, and a floor, each of the end walls having a hollow notch formed in an edge portion thereof to receive a branch section of the parent plant therethrough, wherein a first depth is defined between a level of the floor and a level of an edge portion of an adjacent side wall outside of the notch; and
   first and second seal-receiving cups integrally attached to outer parts of the end walls of the main shell body, the seal-receiving cups including side walls which join the main shell body at areas spaced away from the corresponding hollow notches of the main shell body to define first and second seal receptacles distinct from an interior space of the main shell body, each of the first and second seal-receiving cups having a second depth which is less than the first depth, each of the seal-receiving cups having a distal end wall with a hollow notch formed in an edge portion thereof to receive the branch section of the parent plant therethrough, the notches of the seal-receiving cups being substantially linearly aligned with one another and with the notches of the main shell body;
   wherein the first shell portion has a fixed projection attached to the first side wall thereof opposite the central hinge, and the cover member has a pivotally movable latch plate hingedly attached to a side portion thereof opposite the central hinge, and having an opening formed therein to receive the projection of the first shell portion therein, in order to permit temporary closure of the capsule around the branch section of the parent plant.

2. The horticultural propagation capsule of claim 1, further comprising a plurality of seal members, wherein one of said seal members is provided for placement in each of the respective seal-receiving cups.

3. A kit comprising a plurality of the horticultural propagation capsules of claim 1, wherein the capsules are substantially identical to one another.

4. The kit of claim 3, further comprising a growing medium for placement in the housing.

5. The horticultural propagation capsule of claim 1, wherein the first shell portion has a shallow peripheral groove formed inside of an outer edge portion thereof, and wherein the second shell portion has a peripheral flange extending outwardly on an outer edge portion thereof for nesting engagement in the peripheral groove, in order in order to promote moisture retention in the housing and to enable good alignment of the two shell portions.

6. The horticultural propagation capsule of claim 1, wherein the central hinge is configured as a first living hinge, and wherein the latch plate is attached to the cover member by a second living hinge.

7. A kit comprising the horticultural propagation capsule of claim 1 and a growing medium.

8. A horticultural propagation capsule for use in generating a root-bearing progeny plant from a parent plant, the capsule comprising:
   a hollow housing having a first shell portion and a second shell portion, the first shell portion comprising:
   a main shell body having first and second opposed side walls, first and second end walls connecting the side walls together, and a floor, each of the end walls having a hollow notch formed in an edge portion thereof to receive a branch section of the parent plant therethrough, wherein a first depth is defined between a level of the floor and a level of an edge portion of an adjacent side wall outside of the notch; and
   first and second seal-receiving cups integrally attached to outer parts of the end walls of the main shell body, the seal-receiving cups including side walls which join the main shell body at areas spaced away from the corresponding hollow notches of the main shell body to define first and second seal receptacles distinct from an interior space of the main shell body, each of the first and second seal-receiving cups having a second depth which is less than the first depth, each of the seal-receiving cups having a distal end wall with a hollow notch formed in an edge portion thereof to receive the branch section of the parent plant therethrough, the notches of the seal-receiving cups being substantially linearly aligned with one another and with the notches of the main shell body;
   wherein the first shell portion has at least one fixed projection attached to the first side wall thereof, and the second shell portion has at least one latch plate attached to a side portion thereof, the latch plate having an opening formed therein to receive the projection of the first shell portion in order to permit temporary closure of the capsule around the branch section of the parent plant.

9. The horticultural propagation capsule of claim 8, wherein the first shell portion has a shallow peripheral groove formed inside of an outer edge portion thereof, and wherein the second shell portion has a peripheral flange extending outwardly on an outer edge portion thereof for nesting engagement in the peripheral groove, in order to promote moisture retention in the housing and to enable good alignment of the two shell portions.

10. A horticultural propagation capsule for use in generating a root-bearing progeny plant from a parent plant, the capsule comprising:
    a hollow housing having a first shell portion and a second shell portion pivotally joined together by a central hinge, the housing formed as an integral unitary plastic molding, each of the first and second shell portions comprising:
    a main shell body having first and second opposed side walls, first and second end walls connecting the side walls together, and a floor, each of the end walls having a hollow notch formed in an edge portion thereof to receive a branch section of the parent plant therethrough, wherein a first depth is defined between a level of the floor and a level of an edge portion of an adjacent side wall outside of the notch; and
    first and second seal-receiving cups integrally attached to outer parts of at least one of the end walls of the main shell body, each of the first and second seal-receiving cups having a second depth which is less than the first depth, each of the seal-receiving cups having a distal end wall with a hollow notch formed in an edge portion thereof to receive the branch section of the parent plant therethrough, the notches of the seal-receiving cups being substantially linearly aligned with one another and with the notches of the main shell body, the seal-receiving cups including side walls which join the main shell body at areas spaced away from the corresponding hollow notches of the main shell body to define first and second seal receptacles distinct from an interior space of the main shell body;

wherein the first shell portion has a fixed projection attached to the first side wall thereof opposite the central hinge, and the second shell portion has a pivotally movable latch plate hingedly attached to the first side wall thereof opposite the central hinge, the latch plate having an opening formed therein to receive the projection of the first shell portion in order to permit temporary closure of the capsule around the branch section of the parent plant.

11. The horticultural propagation capsule of claim 10, wherein the first shell portion has a shallow peripheral groove formed inside of an outer edge portion thereof, and wherein the second shell portion has a peripheral flange extending outwardly on an outer edge portion thereof for nesting engagement in the peripheral groove, in order in order to promote moisture retention in the housing and to enable good alignment of the two shell portions.

12. The horticultural propagation capsule of claim 10, wherein the central hinge is configured as a first living hinge, and wherein the latch plate is attached to the second shell portion by a second living hinge.

* * * * *